(12) United States Patent
Kaizerman et al.

(10) Patent No.: US 9,607,233 B2
(45) Date of Patent: Mar. 28, 2017

(54) CLASSIFIER READINESS AND MAINTENANCE IN AUTOMATIC DEFECT CLASSIFICATION

(75) Inventors: Idan Kaizerman, Meitar (IL); Vladimir Shlain, Haifa (IL); Efrat Rozenman, Asseret (IL)

(73) Assignee: Applied Materials Israel Ltd., Rehovot (IL)

(*) Notice: Subject to any disclaimer, the term of this patent is extended or adjusted under 35 U.S.C. 154(b) by 0 days.

(21) Appl. No.: 13/452,771

(22) Filed: Apr. 20, 2012

(65) Prior Publication Data

US 2013/0279796 A1 Oct. 24, 2013

(51) Int. Cl.
| G06K 9/00 | (2006.01) |
| G06K 9/03 | (2006.01) |
| G06K 9/62 | (2006.01) |
| G06T 7/00 | (2017.01) |

(52) U.S. Cl.
CPC .......... *G06K 9/033* (2013.01); *G06K 9/6256* (2013.01); *G06K 9/6267* (2013.01); *G06T 7/0004* (2013.01); *G06T 2207/30148* (2013.01)

(58) Field of Classification Search
CPC ............................. H01L 22/00; G06K 9/6254
See application file for complete search history.

(56) References Cited

U.S. PATENT DOCUMENTS

| 5,991,699 A | 11/1999 | Kulkarni et al. |
| 6,148,099 A * | 11/2000 | Lee et al. .................... 382/149 |
| 6,195,458 B1 | 2/2001 | Warnick et al. |
| 6,256,093 B1 * | 7/2001 | Ravid ................ G01N 21/9501 356/237.2 |
| 6,288,782 B1 | 9/2001 | Worster et al. |

(Continued)

FOREIGN PATENT DOCUMENTS

| WO | WO2013/140302 A1 | 9/2013 |
| WO | WO2013/169770 A1 | 11/2013 |

OTHER PUBLICATIONS

Wang, Peng, Christian Kohler, and Ragini Verma. "Estimating cluster overlap on Manifolds and its Application to Neuropsychiatric Disorders." Computer Vision and Pattern Recognition, 2007. CVPR'07. IEEE Conference on. IEEE, 2007. 6 pages.*

(Continued)

*Primary Examiner* — Sumati Lefkowitz
*Assistant Examiner* — Ryan P Potts
(74) *Attorney, Agent, or Firm* — Lowenstein Sandler LLP

(57) ABSTRACT

A method for classification includes receiving inspection data associated with a plurality of defects found in one or more samples and receiving one or more benchmark classification comprising a class for each of the plurality of defects. A readiness criterion for one or more of the classes is evaluated based on the one or more benchmark classification results, wherein the readiness criterion comprises for each class, a suitability of the inspection data for training an automatic defect classifier for the class. A portion of the inspection data is selected corresponding to one or more defects associated with one or more classes that satisfy the readiness criterion. One or more automatic classifiers are trained for the one or more classes that satisfy the readiness criterion using the selected portion of the inspection data.

19 Claims, 5 Drawing Sheets

(56) References Cited

U.S. PATENT DOCUMENTS

| | | |
|---|---|---|
| 6,292,582 B1 | 9/2001 | Lin et al. |
| 6,650,779 B2 | 11/2003 | Vachtesvanos et al. |
| 6,763,130 B1 | 7/2004 | Somekh et al. |
| 6,922,482 B1* | 7/2005 | Ben-Porath ........... G06K 9/6268 382/146 |
| 6,999,614 B1* | 2/2006 | Bakker et al. ................ 382/159 |
| 7,106,434 B1 | 9/2006 | Mapoles et al. |
| 7,113,628 B1 | 9/2006 | Obara et al. |
| 7,318,051 B2 | 1/2008 | Weston et al. |
| 7,570,796 B2 | 8/2009 | Zafar et al. |
| 7,570,800 B2 | 8/2009 | Lin et al. |
| 7,684,609 B1 | 3/2010 | Toth et al. |
| 7,756,320 B2* | 7/2010 | Honda et al. ................ 382/149 |
| 7,756,658 B2 | 7/2010 | Kulkarni et al. |
| 8,112,241 B2 | 2/2012 | Xiong |
| 8,175,373 B2 | 5/2012 | Abbott et al. |
| 8,194,968 B2 | 6/2012 | Park et al. |
| 8,502,146 B2 | 8/2013 | Chen et al. |
| 8,983,179 B1 | 3/2015 | Yu et al. |
| 2002/0159641 A1 | 10/2002 | Whitney et al. |
| 2002/0159643 A1 | 10/2002 | DeYong et al. |
| 2002/0165837 A1 | 11/2002 | Zhang et al. |
| 2002/0168099 A1 | 11/2002 | Noy |
| 2002/0174344 A1 | 11/2002 | Ting |
| 2003/0167267 A1* | 9/2003 | Kawatani ........................... 707/6 |
| 2004/0013304 A1 | 1/2004 | Viola et al. |
| 2004/0034612 A1 | 2/2004 | Mathewson et al. |
| 2004/0156540 A1* | 8/2004 | Gao et al. ..................... 382/145 |
| 2004/0218806 A1 | 11/2004 | Miyamoto et al. |
| 2004/0263911 A1 | 12/2004 | Rodriguez et al. |
| 2005/0004774 A1 | 1/2005 | Volk et al. |
| 2005/0049990 A1 | 3/2005 | Milenova et al. |
| 2005/0147287 A1 | 7/2005 | Sakai et al. |
| 2005/0169517 A1 | 8/2005 | Kasai |
| 2005/0175243 A1 | 8/2005 | Luo et al. |
| 2005/0196035 A1 | 9/2005 | Luo et al. |
| 2006/0009011 A1 | 1/2006 | Barrett et al. |
| 2006/0048007 A1 | 3/2006 | Yuan et al. |
| 2006/0112038 A1 | 5/2006 | Luo |
| 2007/0047800 A1* | 3/2007 | Hiroi ..................... G06T 7/0004 382/149 |
| 2007/0053580 A1 | 3/2007 | Ishikawa |
| 2007/0063548 A1 | 3/2007 | Eipper |
| 2008/0013784 A1 | 1/2008 | Takeshima et al. |
| 2008/0075352 A1* | 3/2008 | Shibuya et al. ............... 382/141 |
| 2009/0136121 A1 | 5/2009 | Nakagaki et al. |
| 2009/0157578 A1 | 6/2009 | Sellamanickam et al. |
| 2009/0171662 A1 | 7/2009 | Huang et al. |
| 2009/0305423 A1 | 12/2009 | Subramanian et al. |
| 2011/0026804 A1 | 2/2011 | Jahanbin et al. |
| 2012/0027285 A1* | 2/2012 | Shlain .................. G06K 9/6256 382/149 |
| 2012/0054184 A1 | 3/2012 | Masud et al. |
| 2013/0279794 A1 | 10/2013 | Greenberg et al. |
| 2013/0304399 A1 | 11/2013 | Chen et al. |
| 2013/0318485 A1 | 11/2013 | Park et al. |
| 2014/0050389 A1 | 2/2014 | Mahadevan et al. |

OTHER PUBLICATIONS

Ou, Guobin, and Yi Lu Murphey. "Multi-class pattern classification using neural networks." Pattern Recognition 40, No. 1 (2007):4-18.

Chernova, Sonia, and Manuela Veloso. "Multi-thresholded approach to demonstration selection for interactive robot learning." InHuman-Robot Interaction (HRI), 2008 3rd ACM/IEEE International Conference on, pp. 225-232. IEEE, 2008.

Ban, Tao, and Shigeo Abe. "Implementing multi-class classifiers by one-class classification methods" In Neural Networks, 2006. IJCNN'06. International Joint Conference on, pp. 327-332. IEEE, 2006.

Tax, David MJ, and Piotr Juszczak. "Kernel whitening for one-class classification" In Pattern Recognition with Support Vector Machines, pp. 40-52. Springer Berlin Heidelberg, 2002.

Li, Te-Sheng, and Cheng-Lung Huang. "Defect spatial pattern recognition using a hybrid SOM-SVM approach in semiconductormanufacturing." Expert Systems with Applications 36.1 (Jan. 2009): 374-385.

Akay, Mehmet Fatih. "Support vector machines combined with feature selection of breast cancer diagnosis." Expert systems with applications 36, No. 2 (2009): 3240-3247.

Varewyck, Matthias, and J-P. Martens. "A practical approach to model selection for support vector machines with a Gaussian Kernel." Systems, Man, and Cybernetics, Part B: Cybernetics, IEEE Transactions on 41.2 (2011): 330-340.

Wang, Wenjian, et al. "Determination of the spread parameter in the Gaussian kernel for classification and regression." Neurocomputing 55.3 (2003): 643-663.

Xu, Zongben, Mingwei Dai, and Deyu Meng. "Fast and effcient strategies for mdoel selection of Gaussian suport vector machine." Systems, Man, and Cybernetics, Part B: Cybernetics, IEEE Transactions on 39.5 (2009): 1292-1307.

David M.J. Tax; Robert P. W. Duin, "Support Vector Data Description". Jan. 2004, Machine learning, vol. 54, pp. 45-66.

Vapnik, Vladimir N., Section 5.4 The Optimal Separating Hyperplane, The Nature of Statistical Learning Theory, Statistics for Engineering and Information Science, Second Edition, 2000, 1995 Srpinger-Verlag, New York, Inc. pp. 131-163.

Chih-Chung Chang and Chih-Jen Lin, "LIBSVM: A Library for Support Vector Machines," National Taiwan University (2001), updated Mar. 6, 2010, pp. 1-30.

Assaf Glazer and Moshe Sipper, "Evolving an Automatic Defect classification Tool," EvoWorkshops 2008, LNCS 4974 (Springer-Verlag, 2008), pp. 194-203.

LIBSVM—a Library for Support Vector Machines, as downloaded from ww.csie.ntu.edu.tw/~cjlin/libsvm on Jul. 27, 2010.

Scholkopf, Bernhard et al., "New Support Vector Algorithms," Neural Computation 12 (2000), Massachusetts Institute of technology, pp. 1207-1245.

* cited by examiner

CLASSIFIER READINESS AND MAINTENANCE IN AUTOMATIC DEFECT CLASSIFICATION

FIELD OF THE INVENTION

The present invention relates generally to automated inspection, and specifically to methods and systems for analysis of manufacturing defects.

BACKGROUND

Automatic Defect Classification (ADC) techniques are widely used in inspection and measurement of defects on patterned wafers in the semiconductor industry. ADC techniques detect the existence of defects, as well as automatically classify the defects by type in order to provide more detailed feedback on the production process and to reduce the load on human inspectors. ADC techniques are used, for example, to distinguish among types of defects arising from particulate contaminants on a wafer surface and defects associated with irregularities in the microcircuit pattern itself, and may also identify specific types of particles and irregularities.

Various methods for ADC have been described in the patent literature. For example, U.S. Pat. No. 6,256,093 describes on-the-fly ADC in a scanned wafer. A light source illuminates the scanned wafer so as to generate an illuminating spot on the wafer. Light scattered from the spot is sensed by at least two spaced-apart detectors, and is analyzed so as to detect defects in the wafer and classify the defects into distinct defect types.

As another example, U.S. Pat. No. 6,922,482 describes automatically classifying a defect on the surface of a semiconductor wafer into one of a number of core classes, using a core classifier employing boundary and topographical information. The defect is then further classified into a subclass using a specific adaptive classifier that is associated with the core class and trained to classify defects from only a limited number of related core classes. Defects that cannot be classified by the core classifier or the specific adaptive classifiers are classified by a full classifier.

SUMMARY

Embodiments of the present invention that are described herein provide improved methods, systems and software for automated classification of defects based on inspection data.

An exemplary computing system receives inspection data associated with a plurality of defects found in one or more samples. The computing system receives one or more benchmark classification results comprising a class for each of the plurality of defects. The computing system evaluates a readiness criterion for one or more of the classes based on the one or more benchmark classification results, wherein the readiness criterion comprises for each class, a suitability of the inspection data for training an automatic defect classifier for the class. The computing system selects a portion of the inspection data corresponding to one or more defects associated with one or more classes that satisfy the readiness criterion. The computing system trains one or more automatic classifiers for the one or more classes that satisfy the readiness criterion using the selected portion of the inspection data.

In one embodiment, the computing system receives the one or more benchmark classification results by receiving one or more classifications provided by a human inspector or other classification modality.

In one embodiment, the computing system applies the trained automatic classifiers to further inspection data outside of the selected portion of the inspection data to generate a plurality of first classifications for the further inspection data, obtains a plurality of second classifications based on the further inspection data and on the plurality of first classifications, and incorporates the further inspection data and the plurality of second classifications in the selected portion of the inspection data for use in further training of the one or more automatic classifiers.

In one embodiment, the computing system evaluates the readiness criterion by accepting the classes into which at least a threshold number of the defects have been respectively classified in the benchmark classification results.

In one embodiment, the computing system evaluates the readiness criterion by accepting a class that can be classified with at least a threshold level of a performance measure using the inspection data, wherein the performance measure is at least one of accuracy, a classification performance measure, and a rejection performance measure.

In one embodiment, the computing system further provides a result of the automatic classifiers to increase a consistency of manual classification and obtains additional training data from the manual classification.

In one embodiment, the computing system further provides a subset of the further inspection data to an inspection modality for classification, wherein the subset of the further inspection data comprises inspection data that could not be classified by the trained one or more automatic classifiers.

In one embodiment, the inspection modality comprises a classification of defects in the further inspection data by an operator.

In one embodiment, the computing system, for a class that does not satisfy the readiness criterion, identifies a group of defects associated with the class by the inspection modality, collects the further inspection data from the subset of the further inspection data used by the inspection modality in classifying defects in the group of defects, adds the collected further inspection data to the selected portion of the inspection data to generate an augmented training set for the class, determines whether the class satisfies the readiness criterion based on the augmented training set, and upon determining that the class satisfied the readiness criterion based on the augmented training set, training an automatic classifier for the class using the augmented training set.

In one embodiment, upon detecting a change in a distribution of the plurality of defects in further inspection data outside the selected portion of the inspection data, the computing system retrains the one or more automatic classifiers or alerting an operator of a possible problem in production of the samples.

In one embodiment, the computing system retrains the one or more automatic classifiers comprises selecting a subset of defects in the selected portion of the inspection data, wherein the selected subset of defects are selected to reflect a past distribution of the defects among the classes.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
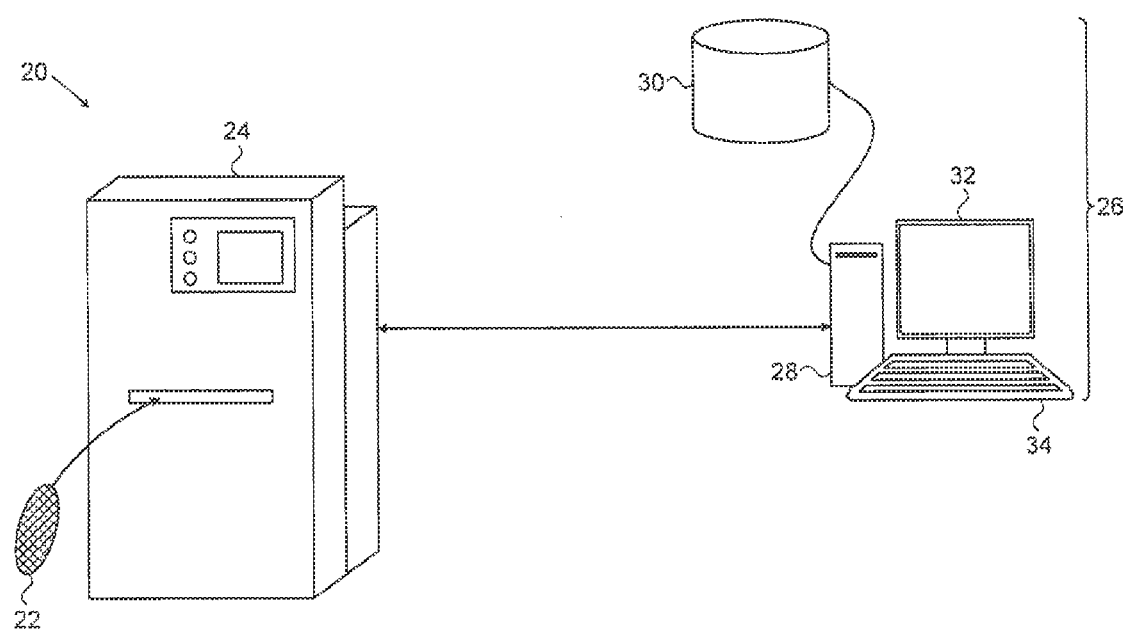
FIG. 1 is an exemplary schematic illustration of a defect inspection and classification system, in accordance with an embodiment of the present invention.

Automatic defect classification (ADC) systems are commonly calibrated using a set of training data. The set of training data may contain inspection data for a collection of defects and benchmark classification results. The benchmark classification results can include class assignments for the defects, typically provided by a human expert. The ADC system uses the training data in order to set classification rules, defined as functions of feature values, for identifying each defect class in a multi-dimensional feature space. The multi-dimensional feature space may also be referred to as a hyperspace when classification involves more than three features. The classification rules may then be tested and adjusted to optimize their accuracy and/or purity.

U.S. patent application Ser. No. 12/844,724, filed Jul. 27, 2010, which is hereby incorporated by reference, describes an ADC system that applies multiple different classifiers to the inspection data, including both multi-class and single-class classifiers. The system permits parameters of the classifiers to be trained and adjusted in order to optimize the purity of classification while maximizing rejection rate of unknown or new defects. Defects that are rejected by the automatic classifiers (as non-decidable or unknown) are passed to another inspection modality, such as a human inspector, who assigns these defects to the appropriate classes.

Embodiments of the present invention provide an ADC system that can determine an amount of pre-classified data that is sufficient to train a classifier for a given defect class in an ADC system The ADC system can therefore determine the stage at which an automatic classifier is ready for operational use. Embodiments may also be used to assess classifier maintenance, such as refining the set of training data and adding automatic classifiers for additional classes of defects to the ADC system.

The ADC system can receives inspection data and corresponding benchmark classification results, and can use the inspection data and benchmark classification results to evaluate a readiness criterion with respect to the defect classes. The readiness criterion can indicate, for each class, the suitability of the inspection data for training an automatic defect classifier for the class. For the classes that are found to satisfy the readiness criterion, the corresponding inspection data is incorporated in a training set, which is then used in training the automatic classifiers for these classes.

To choose the classes that are ready for automatic classification, the ADC system can clean an initial set of pre-classified inspection data to remove certain specific classes and defects. The ADC system can then run a training procedure to train classifiers (single-class and/or multi-class) for the remaining classes. In some embodiments, the ADC system does not develop classifiers for defect classes that do not satisfy certain statistical benchmark criteria, such as classes with less than a certain threshold number of images, classes with high border complexity in the class probability distribution, etc. In these embodiments, the ADC system will leave defects in defect classes that do not satisfy certain statistical benchmark criteria for classification by another inspection modality, such as by a human inspector.

For each class satisfying the statistical benchmark criteria, the ADC system can determine whether a classifier trained on the data in the training set meets a threshold level of performance. The determination can be based on a single measure of performance or integrate several measures of performance. Measures of performance can include classification performance, rejection accuracy, purity, etc. Classification performance can be measured, for example, in terms of classification accuracy. Rejection accuracy can be measured by the ratio between the number of defects rejected from a class of interest when it is used for training and the number of defects rejected from the class when it is not used for training. Therefore, by determining whether a classifier meets a threshold level of performance, the ADC system can verify that the classification or rejection bounds for the class in the attribute hyper-space are compact, such that the bounds contain a sufficiently high fraction of the defects that are in the class without overlapping other defect classes. Once a given classifier meets these criteria, the ADC system can consider the classifier to be trained and ready to automatically classify unclassified defects. Classes that are determined not to be ready are left for another inspection modality, such as manual processing by a human inspector. Classes may be determined not to be ready if defects in regions of the hyper-space are not part of one of the validated classes. In some embodiments, other classification performance criteria may be applied in choosing between automatic classification and other modalities, and the present invention is not limited by the measures used for evaluating classification performance.

In some embodiments, after the initial training of the ADC system, the ADC system can provide a ramp-up mode to allow one or more human inspectors or alternative inspection modalities to manually classify defects, including defects for trained classes, guided by the ADC-suggested automatic classification result for each defect. The ramp-up mode can increase the consistency of manual classification while collecting additional training data that may have fewer manual misclassifications.

During subsequent operation, once a stable automatic classifier has been established, one or more human inspectors can view and classify increasing numbers of defects in less common defect classes. As these less common defect images accumulate, the ADC system may use them to develop and refine classifiers for one or more of the less common classes. Once the training data for a given class has been sufficiently refined to train a classifier that will meet the threshold classification criteria, the ADC system can add this class to the group of classes that are classified automatically, rather than manually. The inspection data that has been collected for this class in the manual classification phase can be added to the training set, and this augmented training set can be used subsequently in training the automatic classifiers.

After automatic classifiers have been trained, maintenance of the classifiers can ensure that the classifiers adapt properly to changes in operating conditions. To maintain the classifiers, the ADC system can monitor statistical criteria for each class and rejection type to detect changing ADC results, such as an increase or decrease in the appearance rate or feature space location of a certain class or classes, an appearance of a new defect type, etc. If the changes in ADC results are due to actual changes in the wafers under inspection, then no retraining of the ADC system may be needed, and the ADC system may alert a system operator of a possible process problem in the production facility. If the changes in ADC results are due to variations in the feature space (e.g., due to aging or calibration drift of an inspection machine), the ADC system may need to retrain the automatic classifiers or adjust the rejection thresholds.

To distinguish between process problems and feature space changes, the ADC system may analyze statistical measures of automatically classified classes, rejection counts for unknown and/or undecidable defects, and feature space variations. A change in one or more of these measures can trigger intervention by a human inspector. In one embodiment, the human inspector validates the ADC results by manually classifying the recent defects that were classified in a specific class or classes. In one embodiment, the human inspector manually classifies defects that were rejected by the automatic classifiers but were not yet manually classified. In one embodiment, the manual classification is initiated only when the rejected defects were not previously manually classified. In an alternate embodiment, the manual classification is initiated when there is a significant time delay between the automated classification and the manual classification of rejected defects.

In some embodiments, the manual classification results are analyzed to determine whether retraining of the automatic classifiers is needed. When retraining is needed, the most recent manually and automatically classified defects for each class can be selected for inclusion in the new training set. The new training set can be constructed by selecting a subset of the defects from the recent inspection data that preserves the past cumulative distribution of the different defect types. In some embodiments, the number of recent defects that is selected from each class is proportional to the past defect count from each class. In some embodiments, at the beginning of each training operation, all classes in the available data are analyzed, and automatic classifiers are trained only for those classes that are ready for training. Over time, new classes for which sufficient examples have accumulated can be added to the training set, and manual classifications are reduced, as explained above.

Therefore, for the ADC system can reliably and systematically decide which defect types should be classified automatically, when classifiers have been trained sufficiently to meet threshold criteria of reliability, and maintain and improve the classifiers based on actual experience in the field.

Although the disclosed embodiments relate specifically to detection of defects in semiconductor wafers, the principles of the present invention may similarly be applied to automated analysis and classification of image features of other types.

FIG. 1 is an exemplary schematic illustration of a system 20 for automated defect inspection and classification, in accordance with an embodiment of the present invention. A sample, such as a patterned semiconductor wafer 22, is inserted into an inspection machine 24. This machine may comprise, for example, a scanning electron microscope (SEM) or an optical inspection device or any other suitable sort of inspection apparatus that is known in the art. Machine 24 typically scans the surface of wafer 22, senses and processes the scan results, and outputs inspection data, comprising images of defects on the wafer 22.

In one embodiment, the inspection data includes a list of defects found on the wafer, the location of each defect, and values of inspection features associated with each defect. The inspection features may include, for example, the size, shape, scattering intensity, directionality, and/or spectral qualities of the defect, as well as defect context and/or any other suitable features that are known in the art. Although the term "inspection data" is used in the present embodiment to refer to SEM images and associated metadata, this term should be understood more broadly to refer to any and all sorts of descriptive and diagnostic data that can be collected and processed to identify features of defects, regardless of the means used to collect the data, and regardless of whether the data are captured over the entire wafer or in portions, such as in the vicinity of individual suspect locations. Some embodiments are applicable to the analysis of defects identified by an inspection system that scans the wafer and provides a list of locations of suspected defects. Other embodiments are applicable to the analysis of defects that are re-detected by a review tool based on locations of suspected defects that were provided by an inspection tool. The invention is not limited to any particular technology by which the inspection data is generated. Thus, for semiconductor applications, embodiments of the invention may be applied to the analysis of data generated by an optical inspection system such as the UVision™ system, a review system such as the SEMVision™ system (both commercially available from Applied Materials Inc.), or by any other sort of inspection system or modality that is known in the art.

ADC machine 26 receives and processes the inspection data outputted by inspection machine 24. If inspection machine 24 does not extract all relevant inspection feature values from the images of wafer 22, ADC machine 26 may perform these image processing functions. Although ADC machine 26 is shown in FIG. 1 as being connected directly to the inspection machine output, in some embodiments, ADC machine 26 may operated on pre-acquired, stored inspection data. In alternate embodiments, the functionality of ADC machine 26 may be integrated into inspection machine 24.

ADC machine 26 may be a general-purpose computer, comprising a processor 28 with a memory 30 for holding defect information and classification parameters, along with a user interface comprising a display 32 and input device 34. The computer implementing the functions of ADC machine 26 may be dedicated to ADC functions, or it may perform additional computing functions, as well. In one embodiment, at least some of the ADC functions described herein are performed by dedicated or programmable hardware logic.

ADC machine 26 can run multiple classifiers, such as a multi-class classifier for distinguishing between different classes and single-class classifiers dedicated to individual classes. The embodiments that follow will be described, for the sake of illustration and clarity, with reference to machine 26 and the other elements of system 20, but the principles of these embodiments may likewise be implemented in any classification system that can handle multiple classes of defects or other unknown features.

Figure 2:
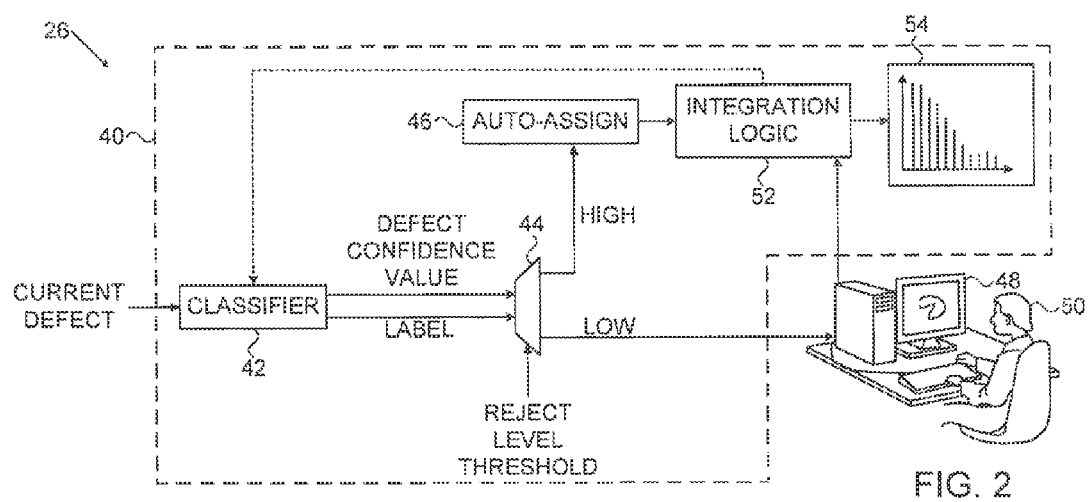
FIG. 2 is a block diagram of an automated defect classification system, in accordance with an embodiment of the present invention.

FIG. 2 is a block diagram illustrating functional elements of an ADC machine (e.g., ADC machine 26 of FIG. 1), in accordance with an embodiment of the present invention. In some embodiments, automatic processing components 40 are executed on processor 28 of FIG. 1, while a human inspector 50 interacts with ADC machine 26 of FIG. 1 via an inspection terminal 48. Automatic processing components 40 may be implemented, for example, as software modules, although at least some of the components may alternatively be implemented in hardware logic or as a combination of hardware and software elements.

In some embodiments, image processing operations are applied by a processor (e.g., processor 28 of FIG. 1) to each defect image captured by an inspection machine (e.g., inspection machine 24 of FIG. 1). The image processing operations may extract a vector of feature values for the defect image, such as shape, texture, and contextual features. Automatic classifier 42 can assign a class label to each defect, along with a confidence value associated with the class label. The confidence value may indicate the likelihood that the defect actually belongs to the assigned class. The readiness of classifier 42 to handle each class of defects can be determined using a procedure that is described further below in conjunction with FIG. 4. In some embodiments, classifier 42 assigns a low (or zero) confidence value to defects that fall outside the bounds of the classes that classifier 42 is ready to handle.

In one embodiment, the confidence threshold is provided by an operator of an ADC machine. In an alternate embodiment, the confidence threshold is computed by the ADC machine based on one or more classification performance measures specified by the operator, such as the target purity and/or the maximum rejection rate. If the confidence of classification of a given defect satisfies the confidence threshold (reject level threshold), an automatic assignment module 46 can accept the classification as correct. In one embodiment, if the confidence of classification does not satisfy the confidence threshold, the defect may be rejected and passed to terminal 48 for visual classification by inspector 50. In one embodiment, the rejected defects are analyzed using additional automatic classification procedures, such as X-ray spectroscopy, etc. In some embodiments, the confidence threshold is determined in order to achieve a balance between the number of rejections and the purity or accuracy of the classification results. Although FIG. 2 shows a single reject level threshold, in alternative embodiments the system operator may set different rejection criteria for different defect classes.

Integration logic 52 can receive both the automatic classification results from module 46 and the results of visual classification from terminal 48 and can generate an integrated report 54. The report 54 may be presented, for example, on display 32, and may show the distribution of defects among the different classes. In some embodiments, the portion of the distribution relating to the more common defect types comes from the automatic classification process, while the less common defect types are classified visually. The report 54 can provide the system operator with a complete picture of the sample or samples under test.

In some embodiments, information collected by integration logic 52 in the course of processing inspection is applied in maintaining and refining classifier 42 (as indicated by the dashed arrow from integration logic 52 to classifier 42 in FIG. 2). For example, logic 52 may integrate the classification results provided by human inspector 50 and/or by other automatic classification modalities to adjust class borders. In some embodiments, integration logic 52 accumulates sufficient visual classification results for a certain small defect class in order to define a reliable automatic classifier for the class. In these embodiments, the ADC machine may then add this class to the group that is handled automatically by classifier 42 and automatic assignment module 46. A method that may be applied for this purpose is described below in conjunction with FIG. 5.

Figure 3:
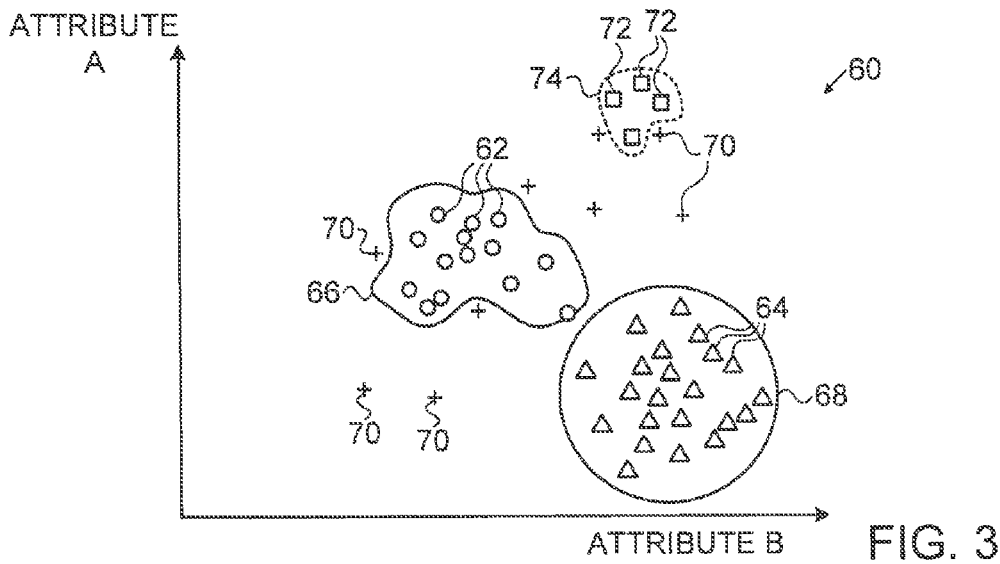
FIG. 3 is an exemplary schematic representation of a feature space containing inspection feature values belonging to different defect classes, in accordance with an embodiment of the present invention.

FIG. 3 is an exemplary schematic representation of a feature space that is mapped to a set of defect, in accordance with an embodiment of the present invention. Feature space 60 is mapped to a set of defects 62, 64, 70, 72. Although the feature space 60 is represented as being two-dimensional, but the classification processes that are described herein are commonly carried out in spaces of higher dimensionality. The defects 62, 64, 70, 72 may have been pre-classified in a number of different classes, one associated with defects 62 (which will be referred to below as "Class Y"), another with defects 64 ("Class Z"), and another with defects 72 ("Class X"). Defects 70 cannot be classified in any of these three classes and may be considered "unknown." Defects 62, 64 and 72 are bounded in the feature space by respective borders 66, 68 and 74. The borders may overlap.

Classes Y and Z are ready for automatic classification because both classes include a large number of defects 62, 64 and have compact borders 66, 68, which discriminate with high confidence between the respective defects in the classes and defects 70 that are outside these classes. Therefore, a classifier, such as classifier 42 of FIG. 2 will be trained using the features of defects 62 and 64 to recognize classes Y and Z in subsequent, unclassified inspection data.

Class X may not be ready for automatic classification because it contains only a small number of defects 72, and it is not clear that border 74 will capture new defects in the class with high confidence, or that other defects 70 outside the class will remain outside the border. For these reasons, the classifier may not initially be trained to handle Class X defects and may assign these defects a low confidence value, so that they are passed on for manual classification. On the other hand, if integration logic subsequently receives a sufficient number of manual classifications for Class X, permitting border 74 to be defined with higher confidence, this class may be added to Classes Y and Z for automatic classification.

Figure 4:
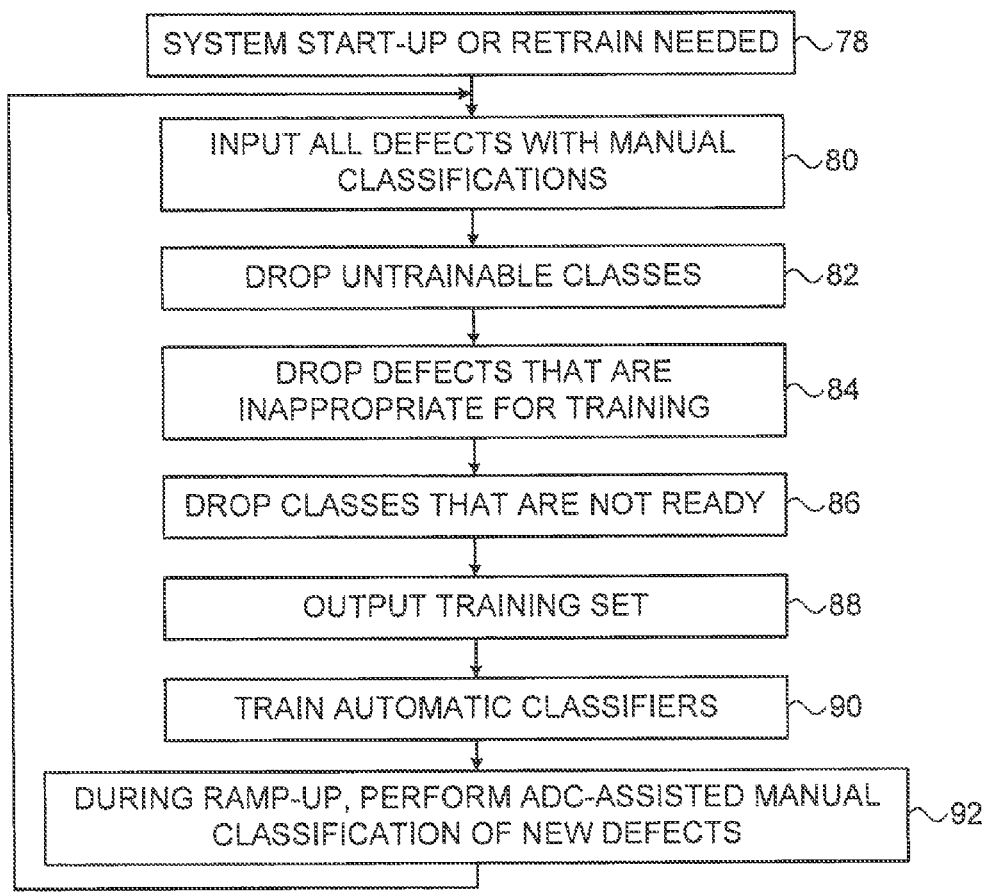
FIG. 4 is a flow diagram illustrating a method for training an automated defect classification system, in accordance with an embodiment of the present invention.

FIG. 4 is a flow diagram illustrating a method for training a classifier, in accordance with an embodiment of the present invention. The method is performed by processing logic that may comprise hardware (circuitry, dedicated logic, etc.), software (such as is run on a general purpose computer system or a dedicated machine), or a combination of both. In one embodiment, the method is performed by ADC machine 26 of FIG. 1.

At block 78, processing logic determines whether the ADC system has started up or if retraining of a classifier is needed. Processing logic can determine if retraining of the classifier is needed by monitoring statistical criteria for each class of the ADC system and rejection type to detect changing ADC results, such as an increase or decrease in the appearance rate or feature space location of a certain class or classes, an appearance of a new defect type, etc. In one embodiment, if the changes in ADC results are due to actual changes in the wafers under inspection, processing logic determines that no retraining of the ADC system is needed. In this embodiment, processing logic may alert a system operator of a possible process problem in the production facility. In one embodiment, if the changes in ADC results are due to variations in the feature space (e.g., due to aging or calibration drift of an inspection machine), processing logic determines that retraining of the ADC system is needed.

At block 80, processing logic receives pre-classified inspection data. The inspection data may include, for example, images of a large number of defects, each of which has been tagged by a human inspector with a benchmark classification. In embodiments where the ADC system need to be retrained, the inspection data may be selected from the most recent inspection data captured for the ADC system, with a distribution of defects that preserves the distribution of defect classes in past inspection data.

At block 82, processing logic removes untrainable classes from the inspection data. The untrainable classes may not be useful in a training a classifier. An untrainable class may be a class associated with a defect that has been marked by a human operator as "unknown" or "unclassifiable," a class associated with a defect that is classifiable, but not into any well-defined, compact class, etc At block 84, processing logic removes the defects that are inappropriate for training a classifier from the inspection data. Defects that are inappropriate for training a classifier may include defects that have poor data quality, such as images that are out of focus or otherwise blurry, or defects that are very small or otherwise difficult to see. Although these defects might be classifiable, with effort, by a human inspector, they are likely to add noise in the training of an automatic classifier.

At block 86, processing logic removes classes that are not ready from the inspection data. Processing logic can determine one or more classes that are not ready by analyzing the remaining defects in the inspection data and evaluating each of the defect classes associated with the remaining defects for classification readiness. In one embodiment, a class that does not meet desired statistical criteria, such as a class having fewer than a certain threshold number of defects in the data set or high border complexity in the feature space, is determined not to be classification ready.

In one embodiment, processing logic determines defects that are inappropriate for training using one or more automatic classifiers. In one embodiment, processing logic trains the one or more classifier using the training set, which includes the remaining data and classes not removed by the processing logic in order to develop and test initial classifiers for these classes. If a classifier for a given class gives automatic classification results that match the benchmark classification results with at least a threshold level of accuracy, the class can be determined to be ready for automatic classification. For example, classes Y and Z corresponding to defects 62 and 64, respectively, in FIG. 3 would be determined to be ready for automatic classification because classes Y and Z match the benchmark classification results. If a class does not satisfy readiness criterion, the class can be determined to not be ready for automatic classification, and can be dropped from the training set of data.

In one embodiment, the readiness of a given class is determined by using a confusion matrix, which shows the actual class distribution (as assigned by a human inspector) of the defects that have been automatically classified in each class. Defect classes classified with high accuracy will exhibit low confusion and can be validated on this basis for subsequent automatic processing. Classes that have not reached this level of readiness, meaning that defects in regions of the hyper-space that are not part of one of the validated classes, are left for manual processing.

At block 88, processing logic determines a training set using the inspection data belonging to the defects in the classes that satisfied the readiness criterion. In some embodiments, the training set contains the inspection data remaining after unready classes and otherwise inappropriate data have been dropped.

At block 90, the training set is used to train the classifier to automatically classify defects in the classes that satisfied the readiness criterion. Once the classifier is trained, the classifier may be ready to classify further inspection data outside the training set.

At block 92, which can be performed during ramp-up of the ADC system (after the initial training has been completed), processing logic can generate and display a suggested classification for each defect. The suggested classification can be used to perform ADC-assisted manual classification of new defects. The ADC-assisted manual classification of new defects can be performed during manual classification by a human inspectors or alternative inspection modalities. The human inspector or alternative inspection modality can use the suggested classification to manually classify all defects, even for trained classes. During the ADC-assisted manual classification, defects are classified twice, both automatically and manually. The purpose of the ramp-up mode of operation is to increase the consistency of manual classification while collecting additional training data with fewer manual misclassifications. Blocks 80-90 may then be repeated, providing further training of the classifier using the manual classifications performed at block 92 as input data. The method may be repeated several times, with increasing human inspector classification consistency in each cycle due to ADC assistance and experience, thus refining the classification performance.

Figure 5:
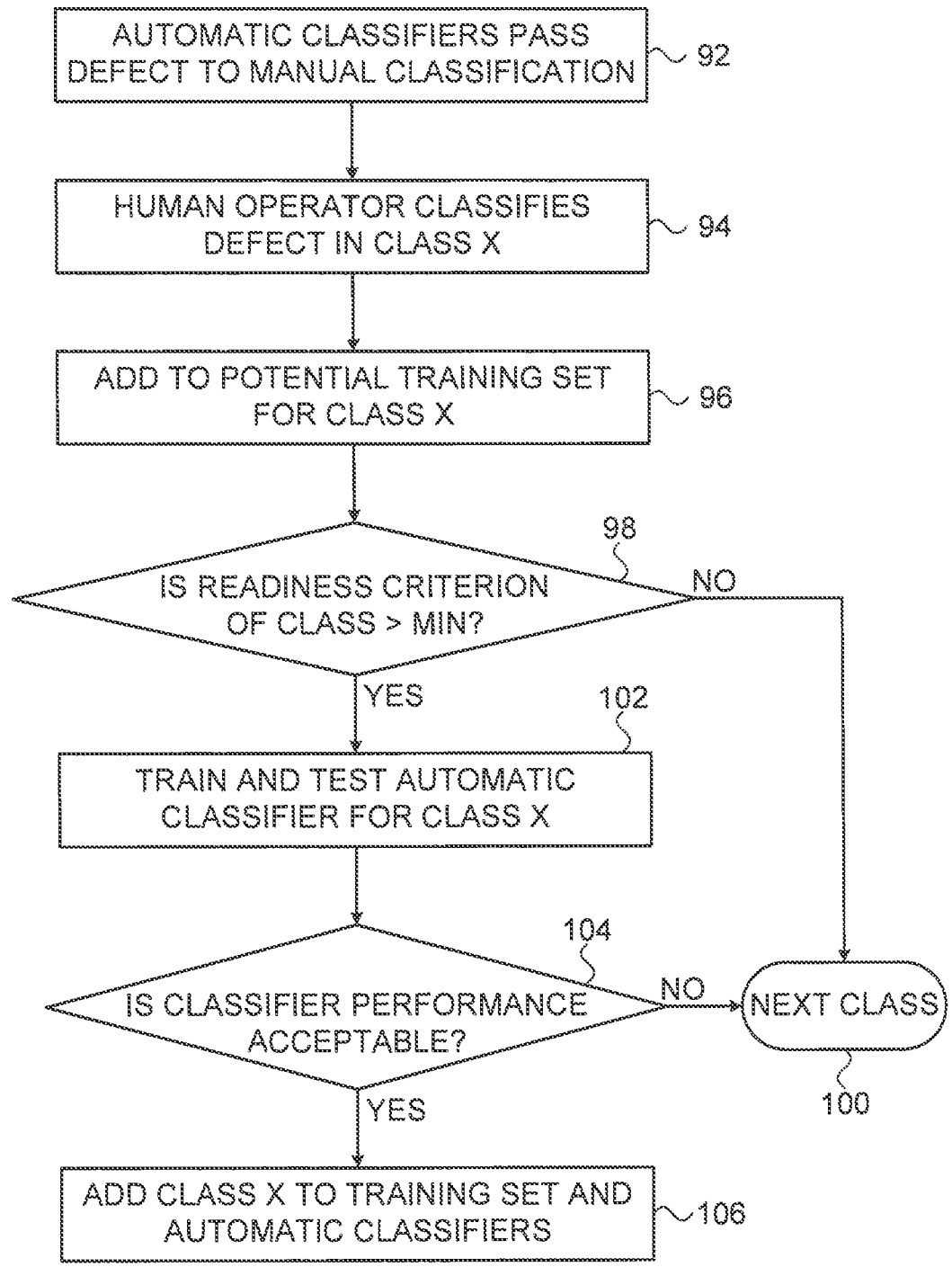
FIG. 5 is a flow diagram illustrating a method for maintaining an automated defect classification system, in accordance with an embodiment of the present invention.

FIG. 5 is a flow diagram illustrating a method for maintaining an automatic classifier, and specifically for broadening the training set and the range of defect classes handled by the automatic classifier, in accordance with an embodiment of the present invention. The method is performed by processing logic that may comprise hardware (circuitry, dedicated logic, etc.), software (such as is run on a general purpose computer system or a dedicated machine), or a combination of both. In one embodiment, the method is performed by ADC machine 26 of FIG. 1. The method is performed periodically during normal operation of an ADC system, and may also be initiated by changes in monitored maintenance criteria.

At block 92, automatic classifiers pass one or more defects to manual classification. In one embodiment, during normal operation of an ADC system, the one or more defects that are passed by an automatic classifier are a subset of the inspection data that the classifier could not automatically classify.

At block 94, processing logic receives a classification for the one or more defects from another inspection modality, such as a human operator. In one embodiment, the human operator enters the classification into a terminal and the terminal passes the classifications to integration logic. In some embodiments, some of the defects for which a classification is received were defects associated with one or more classes that did not previously satisfy the readiness criterion.

At block 96, processing logic identifies the defects that were manually classified for a certain class (e.g., class X) and adds the inspection data associated the defects to a potential training set for the class. Therefore, processing logic collects the data associated with the defects that a human inspector or other modality classified in the class, and creates the potential training set from the data or a subset of the data. In some embodiments, processing logic merges the unused data for the class that was dropped from the initial training set at step 86 of FIG. 4 into the potential training set.

At block 98, processing logic determines whether the readiness criterion of the class is above a predetermined minimum value. In one embodiment, the predetermined minimum value is a minimum threshold size. If the readiness criterion of the class is above a predetermined minimum, the method proceeds to block 102. If the readiness criterion of the class is not above a predetermined minimum, the method proceeds to block 100.

At block 100, processing logic leaves the class out of the automatic classification group, proceeds to the next class or the next defect, and returns to block 92.

At block 102, processing logic trains and tests one or more automatic classifiers for the class. In one embodiment, if the number of defects in the class is above a predetermined amount, processing logic includes the potential training set to the existing training set to generate an augmented training set. Processing logic can use the augmented training set in training and testing each automatic classifier for the class.

At block 104, processing logic determines whether the performance measure of the one or more automatic classifiers is acceptable. In one embodiment, the performance measure of an automatic classifier is acceptable, if the accuracy of the classifications is above a predetermined threshold. In an alternate embodiment, the performance measure of an automatic classifier is acceptable if the accuracy of rejection procedures are above a predetermined threshold. In this embodiment, the automatic classifier should efficiently reject the classes that do not satisfy the readiness criterion without significant rejection of the correctly-classified defects by the automatic classifier. If the performance measure of none of the one or more classifiers is acceptable, the method proceeds to block 100. If the performance measure of at least one classifier is acceptable, the method proceeds to block 106.

At block 106, the classifier is retrained using the augmented training set, and the class is added to the set of classes that are automatically classified by the classifier. Thus, the range of classes handled by the classifier and the accuracy of automatic classifications that the classifier performs may be enhanced over time, during the actual operation of the ADC system in a production environment. The training data set may be gradually augmented not only to encompass new classes, but also to improve the accuracy of automatic classification of existing classes.

Figure 6:
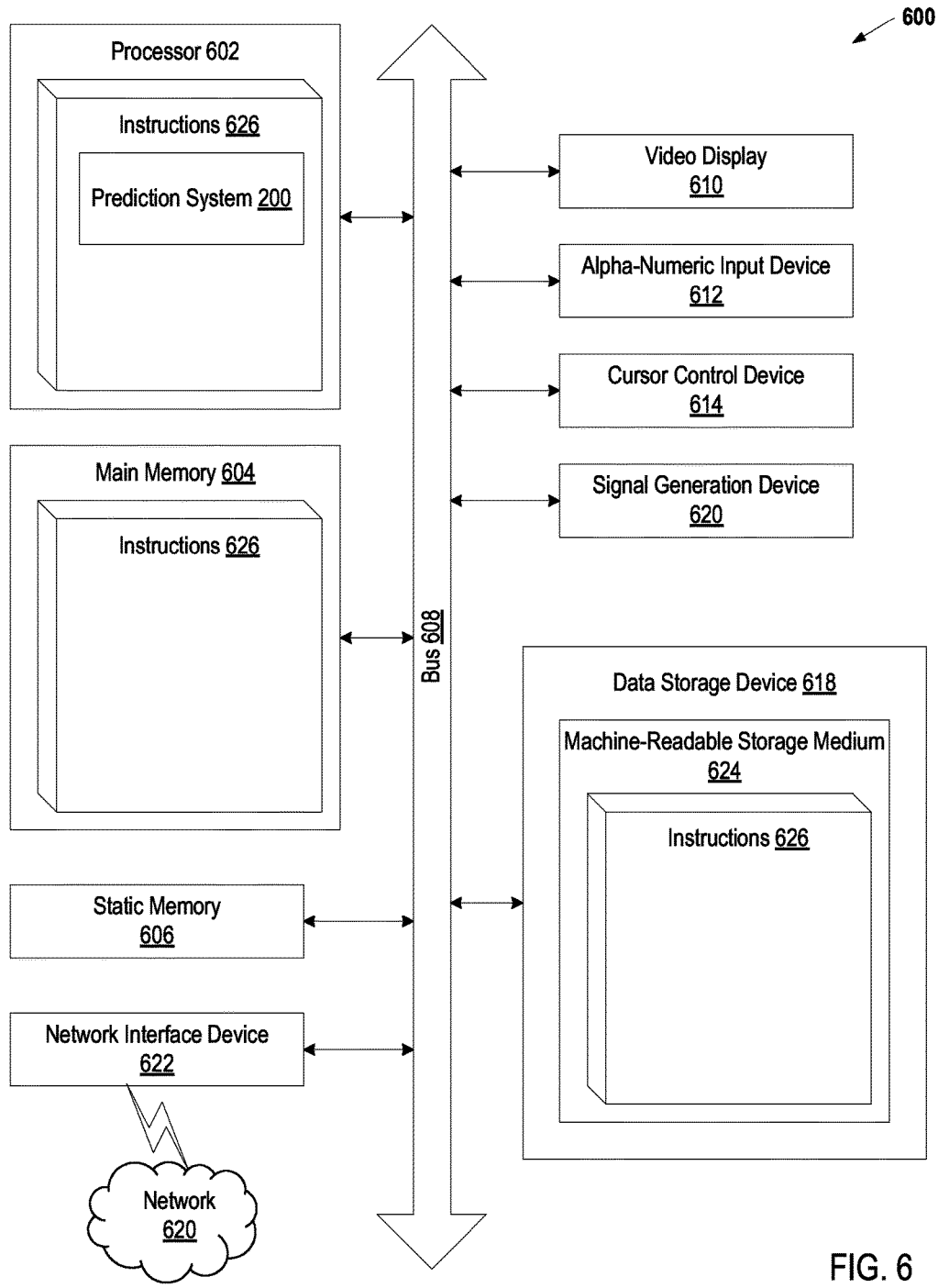
FIG. 6 is a block diagram of an exemplary computer system that may perform one or more of the operations described herein.

FIG. 6 illustrates a diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one embodiment, the instructions 622 include instructions for classifier readiness and maintenance in automatic defect classification and/or a software library containing methods that call a module including instructions for classifier readiness and maintenance in automatic defect classification. In one embodiment, the instructions 622 include instructions for classifier readiness and maintenance in automatic defect classification and/or a software library containing methods that call instructions for classifier readiness and maintenance in automatic defect classification. While the computer-readable storage medium 624 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method for classification, comprising:
receiving, by a computer system, inspection data associated with a plurality of defects found in one or more samples;
receiving, by the computer system, one or more benchmark classification results comprising a class for each of the plurality of defects;
evaluating, by the computer system, a readiness criterion for one or more of the classes based on the one or more benchmark classification results, wherein the readiness criterion for a given class is indicative of a suitability of the inspection data for training an automatic defect classifier for the given class, wherein the suitability of the inspection data for training the automatic defect classifier for the given class is indicated when the readiness criterion is satisfied, wherein the readiness criterion for the given class is satisfied when: an entire number of defects that have been classified in the benchmark classification results into borders of the given class is above a threshold number, and a ratio of a number of defects that have been classified into the borders of the given class with no overlapping with a classification associated with borders from another class to the entire number of defects that have been classified into the borders of the given class matches a predefined criterion;
selecting a portion of the inspection data corresponding to one or more defects associated with one or more classes that satisfy the readiness criterion; and
training one or more automatic classifiers for the one or more classes that satisfy the readiness criterion using the selected portion of the inspection data.

2. The method of claim 1, wherein receiving the one or more benchmark classification results comprises receiving one or more classifications provided by a human inspector or other classification modality.

3. The method of claim 2, further comprising:
applying the one or more trained automatic classifiers to further inspection data outside of the selected portion of the inspection data to generate a plurality of first classifications for the further inspection data;
obtaining a plurality of second classifications based on the further inspection data and on the plurality of first classifications; and
incorporating the further inspection data and the plurality of second classifications in the selected portion of the inspection data for use in further training of the one or more automatic classifiers.

4. The method of claim 1, wherein evaluating the readiness criterion comprises accepting a class that can be classified with at least a threshold level of a performance measure using the inspection data, wherein the performance measure is at least one of accuracy, a classification performance measure, and a rejection performance measure.

5. The method of claim 1, further comprising:
providing a result of the automatic classifiers to increase a consistency of manual classification; and
obtaining additional training data from the manual classification.

6. The method of claim 1, further comprising:
providing a subset of the inspection data to an inspection modality for classification, wherein the subset of the inspection data comprises inspection data that could not be classified by the trained one or more automatic classifiers.

7. The method of claim 6, wherein the inspection modality comprises a classification of defects in the subset of the inspection data by an operator.

8. The method of claim 6, further comprising:
for a class that does not satisfy the readiness criterion, identifying a group of defects associated with the class by the inspection modality;
collecting further inspection data from the subset of the inspection data used by the inspection modality in classifying defects in the group of defects;
adding the collected further inspection data to the selected portion of the inspection data to generate an augmented training set for the class;
determining whether the class satisfies the readiness criterion based on the augmented training set; and
upon determining that the class satisfied the readiness criterion based on the augmented training set, training an automatic classifier for the class using the augmented training set.

9. The method of claim 1, further comprising:
upon detecting a change in a feature-space distribution of the plurality of defects in further inspection data outside the selected portion of the inspection data, retraining the one or more automatic classifiers or alerting an operator of a possible problem in production of the samples.

10. The method of claim 9, wherein retraining the one or more automatic classifiers comprises selecting a subset of defects in the selected portion of the inspection data, wherein the selected subset of defects are selected to reflect a past distribution of the defects among the classes.

11. An apparatus comprising:
a memory; and
a processor to:
receive inspection data associated with a plurality of defects found in one or more samples and one or more benchmark classification results comprising a class for each of the plurality of defects;
evaluate a readiness criterion for one or more of the classes based on the one or more benchmark classification results, wherein the readiness criterion for a given class is indicative of a suitability of the inspection data for training an automatic defect classifier for the given class, wherein the suitability of the inspection data for training the automatic defect classifier for the given class is indicated when the readiness criterion is satisfied, wherein the readiness criterion for the given class is satisfied when: an entire number of defects that have been classified in the benchmark classification results into borders of the given class is above a threshold number, and a ratio of a number of defects that have been classified into the borders of the given class with no overlapping with a classification associated with borders from another class to the entire number of defects that have been classified into the borders of the given class matches a predefined criterion;
select a portion of the inspection data corresponding to one or more defects associated with one or more classes that satisfy the readiness criterion; and
train one or more automatic classifiers for the one or more classes that satisfy the readiness criterion using the selected portion of the inspection data.

12. The apparatus of claim 11, wherein to receive the one or more benchmark classification results comprises receiving one or more classifications provided by a human inspector or other classification modality.

13. The apparatus of claim 12, wherein the processor is further to apply the one or more trained automatic classifiers to further inspection data outside of the selected portion of the inspection data to generate a plurality of first classifications for the further inspection data, to obtain a plurality of second classifications based on the further inspection data and on the plurality of first classifications, and to incorporate the further inspection data and the plurality of second classifications in the selected portion of the inspection data for use in further training of the one or more automatic classifiers.

14. The apparatus of claim 11, wherein to evaluate the readiness criterion, the processor is to accept a class that can be classified with at least a threshold level of a performance measure using the inspection data, wherein the performance measure is at least one of accuracy, a classification performance measure, and a rejection performance measure.

15. The apparatus of claim 11, wherein the processor is further to provide a subset of further inspection data to an inspection modality for classification, wherein the subset of the further inspection data comprises inspection data that could not be classified by the trained one or more automatic classifiers.

16. The apparatus of claim 15, wherein the inspection modality comprises a classification of defects in the further inspection data by an operator.

17. The apparatus of claim 15, wherein the processor is further, for a class that does not satisfy the readiness criterion, to identify a group of defects associated with the class by the inspection modality, to collect the further inspection data from the subset of the further inspection data used by the inspection modality in classifying defects in the group of defects, to add the collected further inspection data to the selected portion of the inspection data to generate an augmented training set for the class, determine whether the class satisfies the readiness criterion based on the augmented training set and upon determining that the class satisfied the readiness criterion based on the augmented training set, to train an automatic classifier for the class using the augmented training set.

18. The apparatus of claim 11, wherein the processor is further to retrain the one or more automatic classifiers upon detecting a change in a feature-space distribution of the plurality of defects in further inspection data outside the selected portion of the inspection data.

19. A non-transitory computer readable storage medium having instructions that, when executed by a processing device, cause the processing device to perform operations comprising:
receiving, by the processing device, inspection data associated with a plurality of defects found in one or more samples;
receiving, by the processing device, one or more benchmark classification results comprising a class for each of the plurality of defects;
evaluating, by the processing device, a readiness criterion for one or more of the classes based on the one or more benchmark classification results, wherein the readiness criterion for a given class is indicative of a suitability of the inspection data for training an automatic defect classifier for the given class, wherein the suitability of the inspection data for training the automatic defect classifier for the given class is indicated when the readiness criterion is satisfied, wherein the readiness criterion for the given class is satisfied when: an entire number of defects that have been classified in the benchmark classification results into borders of the given class is above a threshold number, and a ratio of a number of defects that have been classified into the borders of the given class with no overlapping with a classification associated with borders from another class to the entire number of defects that have been classified into the borders of the given class matches a predefined criterion;

selecting a portion of the inspection data corresponding to one or more defects associated with one or more classes that satisfy the readiness criterion; and training one or more automatic classifiers for the one or more classes that satisfy the readiness criterion using the selected portion of the inspection data.

* * * * *